Nov. 29, 1927.
J. L. GONARD
1,651,270
DEVICE FOR PREVENTING RETROGRADE MOVEMENT OF MOTOR VEHICLES
Filed Nov. 26, 1926  3 Sheets-Sheet 1
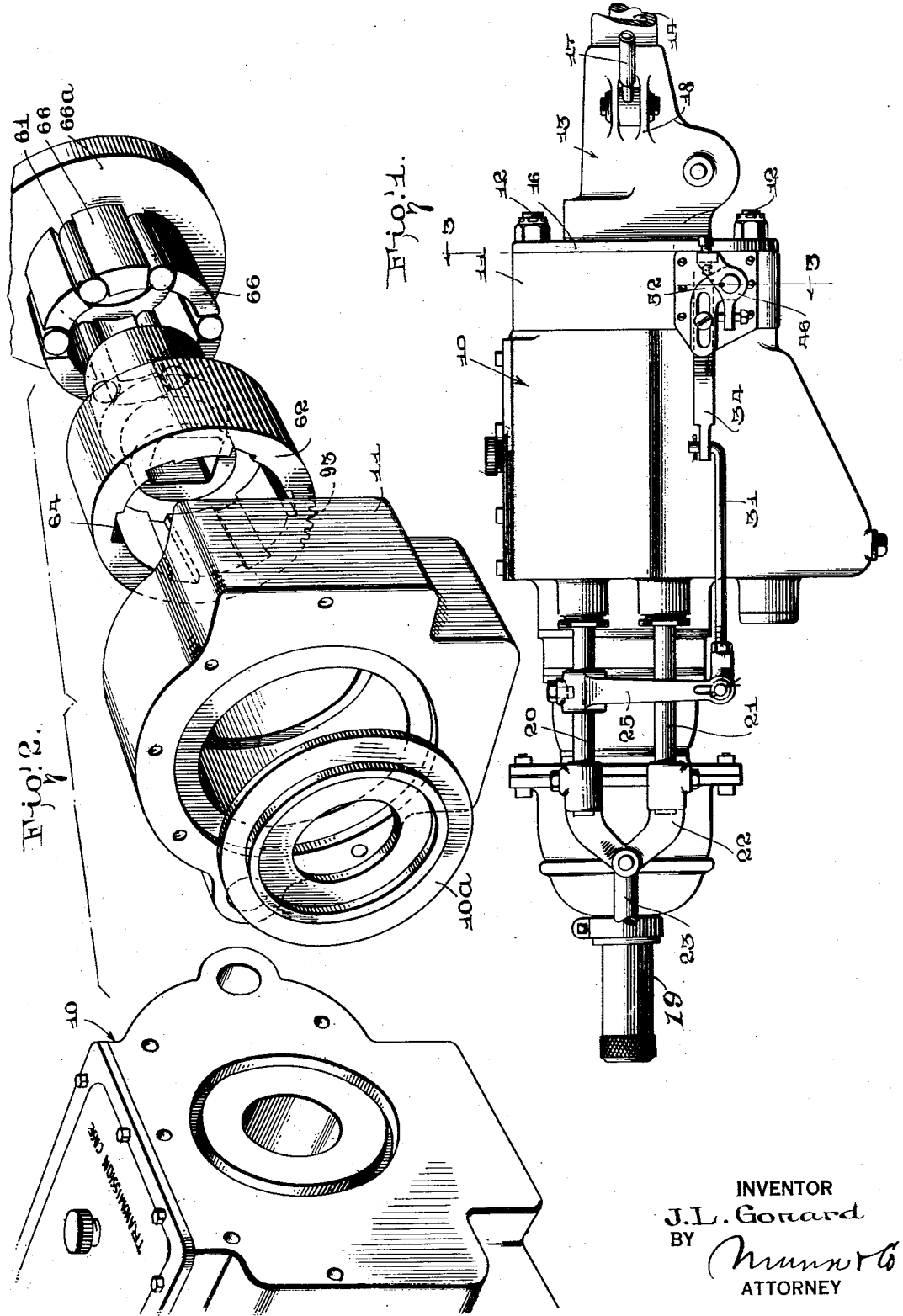
INVENTOR
J. L. Gonard
BY
Munn & Co
ATTORNEY Nov. 29, 1927.　　　　　　　　　　　　　　　　　　　　1,651,270
J. L. GONARD
DEVICE FOR PREVENTING RETROGRADE MOVEMENT OF MOTOR VEHICLES
Filed Nov. 26, 1926　　　　3 Sheets-Sheet 2

INVENTOR
J.L. Gonard.
BY
ATTORNEY

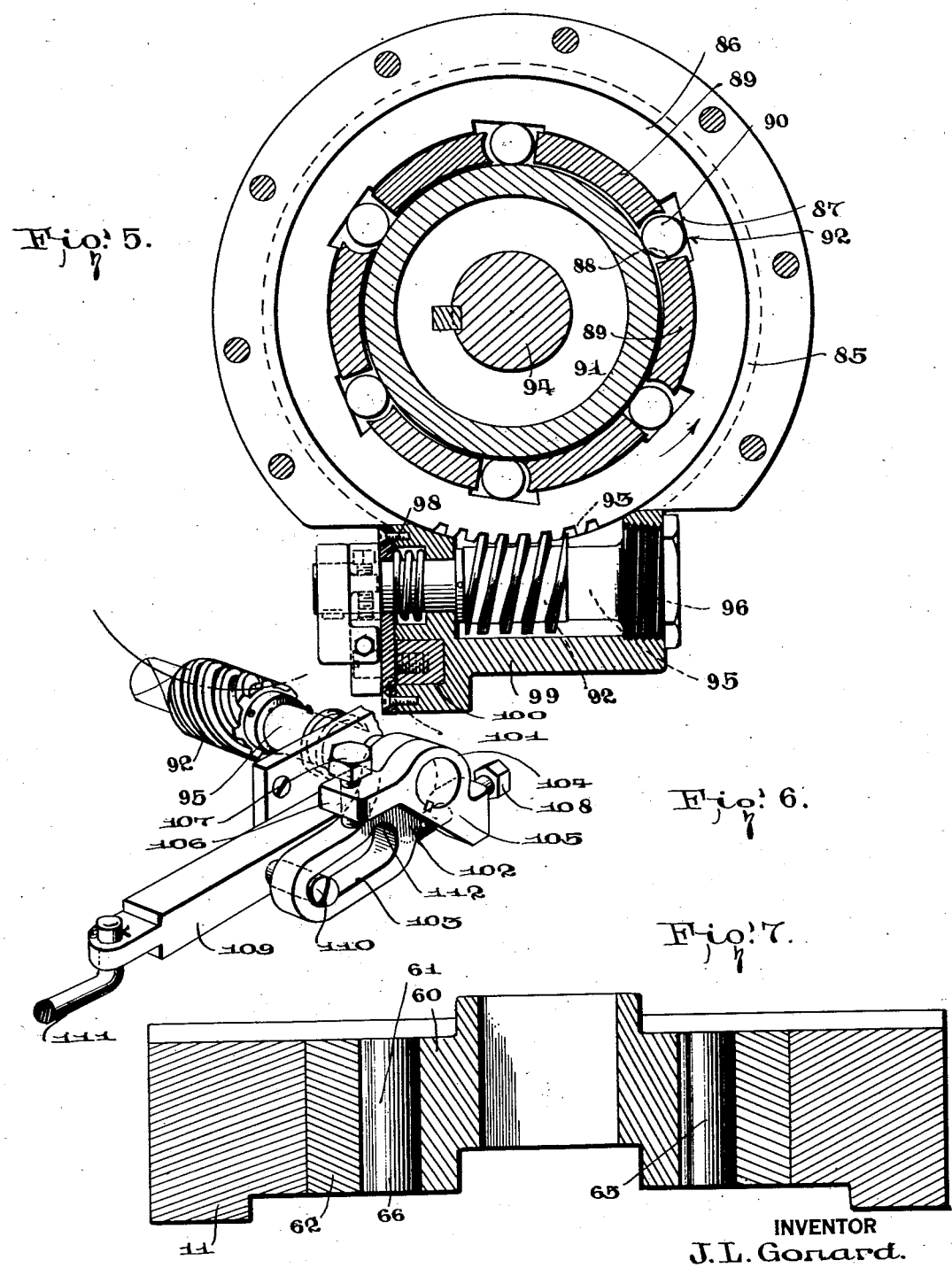

Patented Nov. 29, 1927.

1,651,270

UNITED STATES PATENT OFFICE.

JOHN L. GONARD, OF ENGLEWOOD CLIFFS, NEW JERSEY, ASSIGNOR, BY MESNE ASSIGNMENTS, TO KANT-BACK CORPORATION, A CORPORATION OF NEW JERSEY.

DEVICE FOR PREVENTING RETROGRADE MOVEMENT OF MOTOR VEHICLES.

Application filed November 26, 1926. Serial No. 150,849.

This invention relates to a device for preventing retrograde movement of a vehicle and is an improvement on the device described and claimed in my co-pending application, Serial Number 728,219, filed July 26, 1924.

An object of the invention is the provision of a device which will automatically lock the running gear of an automobile to prevent backward movement of the automobile when the same has been stopped on an inclined roadbed.

A further object of the invention is the provision of a device which will prevent retrograde movement of an automobile while locking the driving elements connected with the rear wheels against reverse motion for permitting the automobile to be reversed under the power of the engine.

A further object of the invention is the provision of a device which will prevent retrograde movement of an automobile when said automobile is on an incline and when the clutch has been thrown out but which will automatically release the locking means when the reversing gear has been thrown into operation, the clutching mechanism preventing retrograde movement of an automobile when the clutch and brake pedals have been released, so that the automobile may be readily started for forward movement without any danger of stalling the engine.

A still further object of the invention is the provision of a device which will prevent retrograde movement of an automobile when said automobile is on an incline and in which one of the clutching elements is adapted to be positively shifted to insure gripping of the drive shaft connected with the rear wheels by the clutch elements employed for the purpose.

This invention will be best understood from a consideration of the following detailed description, in view of the accompanying drawings forming a part of the specification; nevertheless, it is to be understood that the invention is not confined to the disclosure, being susceptible of such changes and modifications which shall define no material departure from the salient features of the invention as expressed in the appended claims.

Figure 1 is a longitudinal side view of the transmission showing my invention applied thereto, Figure 2 is a view in perspective showing the parts of my clutch in detached relation, Figure 3 is a view in elevation partly in section of my improved clutching mechanism to prevent retrograde movement, Figure 4 is a view in perspective of the operating mechanism for the clutch elements, Figure 5 is a vertical section of the modified form of the invention, Figure 6 is a view in perspective of the operating parts of the modified form, and Figure 7 is a vertical section of the device.

Referring more particularly to the drawings it will be noted that one form of transmission 10 as employed in a certain type of automobile is shown to which is connected a clutch casing 11. In this case the rear cover of the transmission casing 10 has been removed and the casing 11 is secured by means of bolts 12 directly to the rear end of the transmission housing. A journal 13 for a drive shaft 14 is formed integrally with an end plate 16 of the casing 11, the journal or bearing 13 being supported by means of tie rods 17 which are pivotally connected to ears 18 projecting from the bearing 13. An engine drive shaft 19 projects from the forward end of the casing 10 and a pair of shifter rods 20 and 21 extend beyond the forward end of the housing 10 and are connected together by means of a yoke 22. An operating rod 23 connected with the yoke 22 extends forwardly and is operated by the usual shifting lever (not shown).

An arm 25 has a sleeve 26 secured to the shifter rod 20 by means of a bolt 27. The arm is curved adjacent its upper end so that it may be readily operated without interference from the rod 21. The lower end of the arm 25 is provided with a bearing 28 to receive a pin 29 which is received in perforations in the eye 28 and a perforated enlargement or eye 30 carried at the end of a rod 31. The rod 31 has an upturned portion 32 inserted through the perforation in a finger 33 carried by an actuating bar 34. A cotter pin 35 passing through perforations in the portion 32 of the rod 31 maintains the bent end of the rod 31 in operative relation with the perforated finger 33. A bar 34 is slidably mounted in bearings in the casing 11 and is provided with a stud 36 which may be formed integrally with the bar 34 or removably connected therewith.

A rock shaft 37 is mounted in bearings in the casing 11 and has at one end a worm 38. The casing 11 has a threaded opening 39 to receive the plug 40 in the inner end of which is provided a bearing 41 to receive the reduced end 42 of the rock shaft 37. The worm 38 and plug 40 are located within a recess 43 formed in the lower end 44 of the casing 11. The plug 40 may be removed to inspect the adjacent parts and for removing or supplying lubricant to the lower portion of the casing 11.

On the outer end of the shaft 37 and located beyond the side wall of said casing is rigidly mounted a sleeve 45 having an arm 46 and an arm 47 projecting laterally therefrom. The arm 46 is provided with an adjusting screw 48 while the arm 47 is provided with an adjusting screw 49. It will be noted that the screw 48 is mounted in an offset portion 50 of the arm 46 while the screw 49 is mounted in an offset portion 51 of the arm 47. A lever 52 has a sleeve 53 received by the shaft 37 with the sleeve located in contact with the sleeve 45 and substantially in the same plane with the offset portion 50 and 51 so that the slotted end 54 of the lever 52 will be adapted to be engaged by the end of the screws 48 and 49. Since the sleeve 45 is keyed or secured to the shaft 37 in any approved manner and since the screws 48 and 49 engage the opposite portions of the lever 52 said lever will be rocked simultaneously with the rocking of the shaft 37. By this construction it will be seen that the position of the lever 52 may be varied at will to suit the needs of the various types of transmissions of automobiles, in order that the mechanism when operated through the shifting lever will actuate certain elements of the device as will be presently explained. A slot 55 of the lever 52 is adapted to be received by the lug 36 and is normally seated within the offset portion 56 of said slot.

The clutching elements for preventing retrograde motion of the drive shaft 14 is located within the casing 11 and consists of a sleeve 60 with a portion 14ª of the shaft 14, a plurality of balls or rollers 61 and a ring 62 which is adapted to be rotated or rocked through a slight angle. The ring 62 is revolvably mounted in the casing and on curved fingers 66 forming bearings. The fingers are spaced from each other to provide slots 63 and are carried by a disc 66ª. Said ring at spaced points is provided with recesses 64. Each recess is alined with a slot 63 to receive a roller 61. It will be noted that an edge 67 of a finger is curved in accordance with the curvature of the roller 61 so that when the roller has been moved to one end 68 of the recess the roller will be received by the curved portion 67 and therefore prevent gripping action between the roller and the ring 60 and the inclined face 69 of the ring 62. A second ring or disc 10ª is at the inner end of the housing 11 and maintains the parts in said housing in position.

Referring more particularly to Figure 3 it will be seen that a door 70 is removably connected by means of screws 71 to the casing 11 and is adapted to carry a bearing 72 for the outer end of the shaft 37. This door is provided with slot 73 shown in dotted lines in Figure 3 through which the stud 36 projects and is adapted to be oscillated during the reciprocating movement of the bar 34.

The operation of my device is as follows: When the rod 23 is reciprocated by the shifting lever for placing the transmission gears into any position for changing the speed of the vehicle except the reverse position of the lever, the clutch elements which are associated with the squared portion 14ª of the shaft 14 will be in position to grip said shaft and hold it against reverse movement. When the shifting lever has been moved to reverse position, however, the clutch elements are so arranged relative to the shaft or member 60 on said shaft that the shaft 14 may be reversely rotated in a positive manner by the engine for causing rearward movement of the vehicle.

In order to properly understand the operation of the device it is thought necessary to first define the relative position of the various elements when the shifting lever has been moved to reverse position. When the member 62 has been revolved in the direction indicated by the arrow in Figure 3, the balls 61 each will be located within the restricted portion of their respective recesses 64, that is, away from the curved ends 67 of the fingers 66. At this time the balls are frictionally clamped between the members 60 and the inclined wall 69 of the recess 64. The slight rotation of the member 62 in the direction indicated by the arrow is caused by the similar rotation of the worm 38 through the rotation of shaft 37. The shaft 37 is rocked in either direction by the rocking of the lever 52 by means of the stud 36 riding in the slot 55 of the lever 52. The stud 36 is shifted by means of the shifting of the bar 34, link 31 and the arm 25. These elements in turn are shifted by the reciprocating movement of the rod 23 which is connected with the shifting lever. Since the rod 23 is connected with the yoke 22 which operates the shifter rods 20 and 21 reciprocation of the rod 23 will cause the lever 52 to be rocked in the direction indicated by the arrow in Figure 4, thereby oscillating ring 62 and forcing the balls 65 into the enlarged portion of the recess 64 and in contact with the curved portions 67 of the fingers 66. At this time the stud 36 will have moved from the forward end 80 of the slot 55 to the recess 56 of said slot without rocking the lever 52. However, beyond this point said lever is actually rocked since the stud 36 is in contact with the lever. The balls will not have any clutching action whatever in such position. Upon the rods 23 being moved in the direction indicated by the arrow in Figure 1 the lever 52 will be oscillated, causing said lever to be moved to its normal inoperative position so that the slot 55 will be disposed horizontally and the pin 36 may ride in said slot during various positioning of the shifting lever for changing from low to high speed or when the shifting lever has been placed in neutral position without affecting rocking of said lever. However, from neutral to reverse position of the lever, the lever 52 is idle but when the shifting lever is moving into reverse position the lever will be rocked and the balls 61 are placed in an inoperative position and out of clutching relation with the elements 60 and 62. In all other positions of the shifting lever the rock lever 52 will be in the position shown in Figure 4 and the member 62 will have been so positioned that the restricted portions of the recesses 64 will receive the rollers 61 so that said balls will be in a ready position to cause a clutching action between the various elements to prevent reverse rotation of the drive shaft 14.

Referring more particularly to Figure 5 a modified form is disclosed illustrating the application of the device for preventing retrograde movement to a different form of transmission. In this construction a similar arrangement is provided and actuated in the same manner to accomplish a like result. A housing 85 encloses a rockable ring 86 having recesses 87 which co-operate with slots 88 between spaced fingers 89 provide a pocket for housing the rollers 90. These rollers are adapted to ride upon a hub or sleeve 91 which forms an element of the clutching mechanism. The outer face of the pocket 87 is inclined, as shown at 92, when the roller is jammed into the reduced portion of the pocket by the rocking of the ring 86 through a worm 92 in mesh with teeth 93 of the ring 86. The sleeve 91 is keyed to the drive shaft 94. The worm 92 is carried by a rock shaft 95 having one end mounted in a bearing of the threaded plug 96, the other end being carried by a bearing 97 formed on a closure plate 98 which is secured to the lower end of the housing 85. The lower end 99 of the housing is provided with a passage 100 and the door 98 is provided with a passage 101.

A lever 102 having a slot 103 is carried by the shaft 95 by means of a sleeve 104. The adjusting member 105 has an arm 106 provided with a set screw 107 engaging one face of the lever 102. The member 105 is rigidly secured to the shaft and rocked thereby. Since the screw 107 engages the lever 102 said lever will be rocked when the shaft is rocked. A second screw 108 carried by the member 105 engages a lever 102 and in co-operation with the screw 107 is adapted to lock the member 105 to the lever.

A shifting rod or bar 109 is slidably mounted in the passage 100 and is provided with a lug 110 riding in the slot 103 with the lug riding in the opening 101 of the door 98. A link 111 is adapted to connect the sliding bar 109 with the shifter rod in the same manner as is illustrated in Figure 4.

The stud 110 is adapted to ride in the slot 103 to the opposite end, as indicated at 112, without causing oscillation of the lever 102. Beyond this point the stud being seated within the groove 112 will cause reciprocation of the lever, and thereby rock the ring 86 and cause the larger portion of the recess 87 to receive the rollers 90 with the rollers being disposed within the curved portion 114 of said recess.

The fingers 87 are curved to conform to the circumference of the sleeves 91 that are carried by a plate which is similar to the plate 66ª.

I claim:—

1. A device for preventing retrograde movement of motor vehicles comprising a drive shaft, a sleeve secured to the shaft and forming a clutch element, a plurality of spaced curved fingers mounted in a fixed position about the sleeve, a ring rockably mounted on the fingers and provided with a plurality of pockets, each pocket having an inclined face forming one wall of the pocket, rollers located between the spaced fingers and in the pockets in the ring, and means for rocking the ring.

2. A device for preventing retrograde movement of motor vehicles comprising a drive shaft, a sleeve secured to the drive shaft, curved fingers fixed relative to the shaft and embracing the sleeve, a ring rockably mounted on the fingers and provided with spaced pockets rollers located in each pocket, the ring being provided with a plurality of inclined faces, each face forming one wall of the pocket and adapted to be engaged by the rollers and prevent rotation of the shaft in one direction, and means for rocking the ring so that the inclined face will engage the roller and cause said rollers to clutch the sleeve and prevent rotation of the sleeve and shaft in one direction.

3. A device for preventing retrograde movement of motor vehicles comprising a drive shaft, a sleeve secured to the drive shaft, curved fingers fixed relative to the shaft and embracing the sleeve, a ring rockably mounted on the fingers and provided with spaced pockets, rollers located in each pocket, the ring being provided with a plurality of inclined faces, each face forming one wall of the pocket and adapted to be engaged by the rollers and prevent rotation of the shaft in one direction, means for rocking the ring so that the inclined face will engage the rollers and cause said rollers to clutch the sleeve and prevent rotation of the sleeve and shaft in one direction, said fingers having one edge curved to receive the rollers when said rollers are out of frictional contact with the inclined wall and with the sleeve.

4. A device for preventing retrograde movement of motor vehicles comprising a drive shaft, a sleeve secured to the shaft and forming a clutch element, a plurality of spaced curved fingers mounted in a fixed position above the sleeve, a ring rockably mounted on the fingers and provided with a plurality of pockets, each pocket having an inclined wall, rollers located between the spaced fingers and in the pockets in the ring, means for rocking the ring, said last-mentioned means including a rock-lever and an oscillating means, said rock lever being adapted to remain stationary throughout the greater period of oscillation of said oscillating means.

5. A device for preventing retrograde movement of motor vehicles comprising a drive shaft, a sleeve secured to the shaft and forming a clutch element, a plurality of spaced curved fingers mounted in a fixed position above the sleeve, a ring rockably mounted on the fingers and provided with a plurality of pockets, each pocket having an inclined wall, rollers located between the spaced fingers and in the pockets in the ring, means for rocking the ring, and means for varying the time of rocking of the ring.

6. A device for preventing retrograde movement of motor vehicles comprising a housing, a drive draft in said housing, a sleeve secured to the drive shaft, a disc connected with the housing and provided with a plurality of spaced fingers disposed circumferentially within the housing, a plurality of rollers located between the spaced fingers and normally seated on the sleeve, and rockable means adapted to engage the rollers to force them in frictional contact with the sleeve to prevent rotation of the shaft in one direction.

7. A device for preventing retrograde movement of motor vehicles comprising a housing, a drive shaft in said housing, a sleeve secured to the drive shaft, a disc connected with the housing and provided with a plurality of spaced fingers disposed circumferentially within the housing, a plurality of rollers located between the spaced fingers and normally seated on the sleeve, rockable means adapted to engage the rollers to force them in frictional contact with the sleeve to prevent rotation of the shaft in one direction.

8. A device for preventing retrograde movement of motor vehicles comprising a housing, a sleeve in the housing, a shaft in said housing and rigid with the sleeve, a plurality of rollers spaced at intervals on the sleeve, rockable means adapted to force the rollers in frictional engagement with the sleeve to prevent rotation of the shaft in one direction, and means for actuating the rockable means.

9. A device for preventing retrograde movement of motor vehicles comprising a housing, a sleeve in the housing, a shaft in said housing and rigid with the sleeve, a plurality of rollers spaced at intervals on the sleeve, rockable means adapted to force the rollers in frictional engagement with the sleeve to prevent rotation of the shaft in one direction, means for actuating the rockable means, and means for maintaining the rollers in spaced relation about the sleeve.

10. A device for preventing retrograde movement of motor vehicles comprising a housing, a sleeve in the housing, a shaft in said housing and rigid with the sleeve, a plurality of balls or rollers spaced at intervals on the sleeve, rockable means adapted to force the balls in frictional engagement with the sleeve to prevent rotation of the shaft in one direction, means for actuating the rockable means, means for maintaining the balls in spaced relation about the sleeve, said spacing means being provided with means to receive the balls when said balls are located in inoperative position relative to the sleeve.

11. A device for preventing retrograde movement of motor vehicles comprising a housing, a sleeve in the housing, a shaft in said housing and rigid with the sleeve, a plurality of balls or rollers spaced at intervals on the sleeve, a rockable means adapted to force the balls in frictional engagement with the sleeve to prevent rotation of the shaft in one direction, means for actuating the rockable means, said actuating means comprising a rock shaft, a screw carried by the shaft, said rockable means being provided with threads in mesh with the screw, shifter rods, and means for operatively connecting the rock shaft with the shifter rods whereby said rock shaft will be actuated.

12. A device for preventing retrograde movement of motor vehicles comprising a transmission, a shifting rod for the transmission, a drive shaft adapted to be rotated in either direction by the transmission, a sleeve secured to the shaft and forming a clutch element, a plurality of spaced curved fingers mounted in a fixed position about the sleeve, a ring rockably mounted on the fingers and provided with a plurality of pockets, said ring having a series of inclined faces adjacent its inner periphery, each inclined face forming one wall of a pocket, a rotatable element located between a pair of spaced fingers and in each pocket in a ring and adapted to co-operate with the inclined faces for gripping the sleeve and preventing rotation of the shaft in one direction, means for rocking the ring in opposite directions, the shifting rod being operatively connected with the rocking means so that when the shifting rod is moved to reverse position the ring will be moved for causing the inclined faces to be out of engagement with the rotatable elements and thus permit rotation of the shaft, rocking movement of the ring in the opposite direction by the neutral and forward positions of the shifting rod causing rocking of the ring in the opposite direction so that the rotatable elements will be in a position to prevent rotation of the shaft in one direction.

13. A device for preventing retrograde movement of motor vehicles comprising a drive shaft adapted to be rotated in either direction, a transmission, a shifting rod for the transmission, a sleeve secured to the shaft and forming a clutch element, a second sleeve provided with a plurality of spaced circumferentially disposed slots therethrough, said second sleeve being fixed against rotation and adapted to receive the first mentioned sleeve, a ring rockably mounted on the second mentioned sleeve and provided with a plurality of pockets, said ring having inclined faces, each inclined face forming one wall of a pocket, rollers mounted within the slots in the second mentioned sleeve and also in the pockets in the ring, and means for rocking the ring in opposite directions causing the rollers to grip the first mentioned sleeve and prevent rotation of the drive shaft in one direction, said rocking means being operatively connected with the shifting rod.

JOHN L. GONARD.